J. C. Hoadley,
Steam-Boiler Condenser.

Nº 19,197.

Patented Jan. 26, 1858.

2 Sheets—Sheet 1.

Witnesses

Inventor
J. C. Hoadley

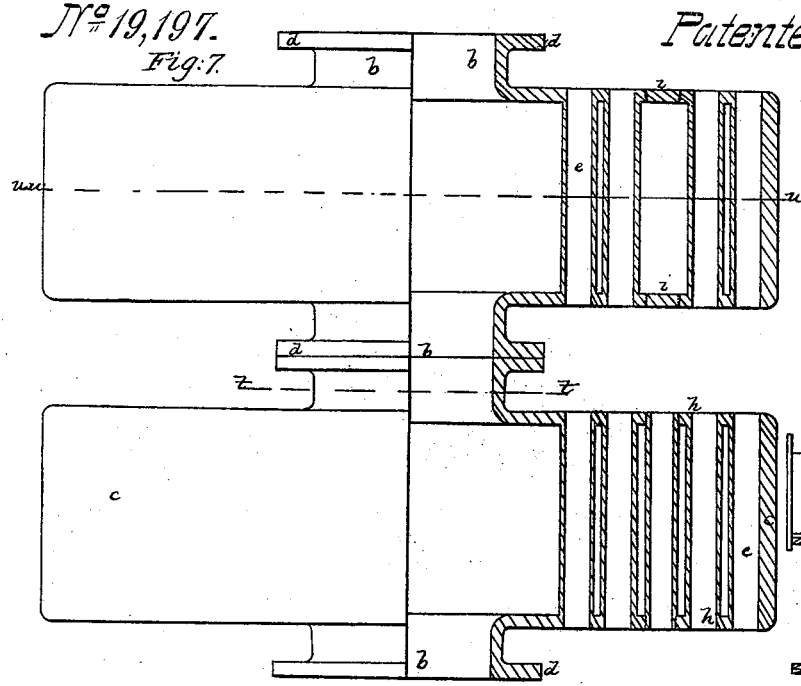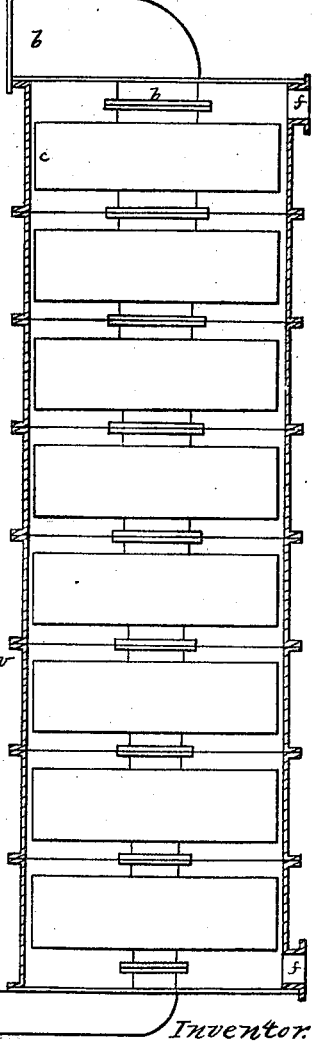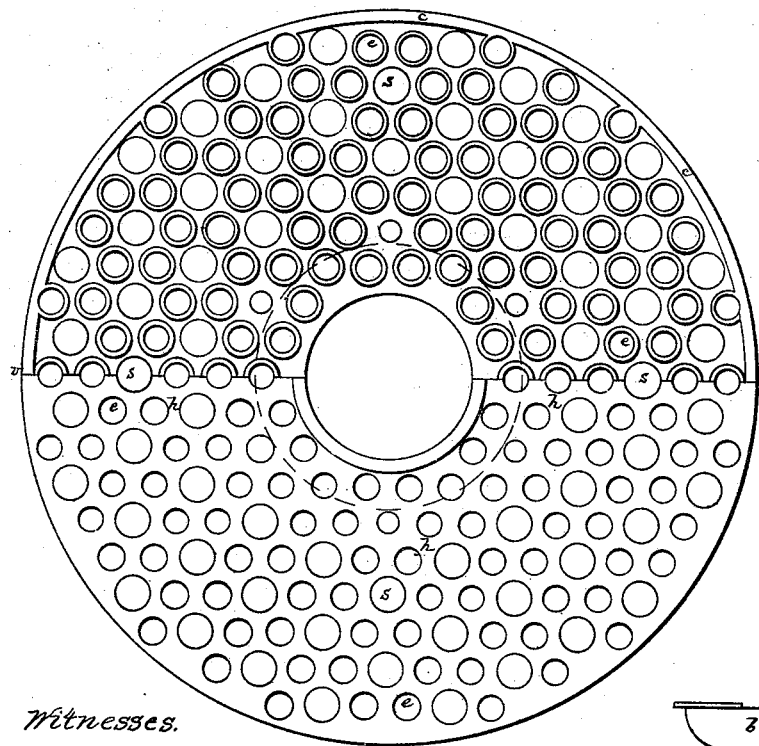

UNITED STATES PATENT OFFICE.

JOHN C. HOADLEY, OF LAWRENCE, MASSACHUSETTS.

HEATER OR COOLER.

Specification of Letters Patent No. 19,197, dated January 26, 1858.

*To all whom it may concern:*

Be it known that I, JOHN C. HOADLEY, of the city of Lawrence, in the county of Essex and State of Massachusetts, have invented an Improvement in Heaters or Coolers; and I do hereby declare that the following is a clear, full, and exact description thereof, reference being had to the accompanying drawings, which form a part of this specification, which is sufficient to enable those skilled in the art to make and use my invention.

Figure 1:
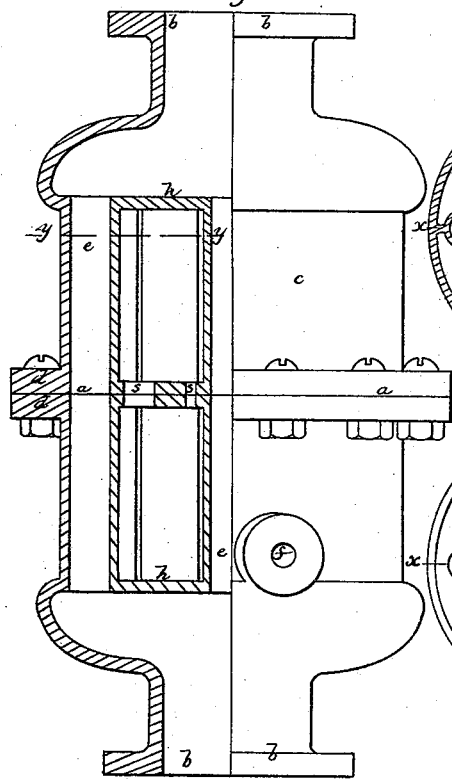
Figure 4:
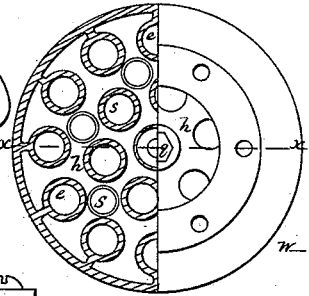
Figure 5:
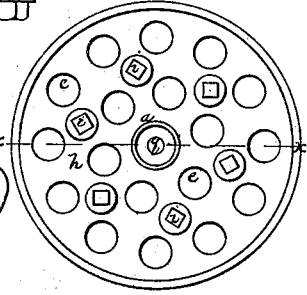
Figure 3:
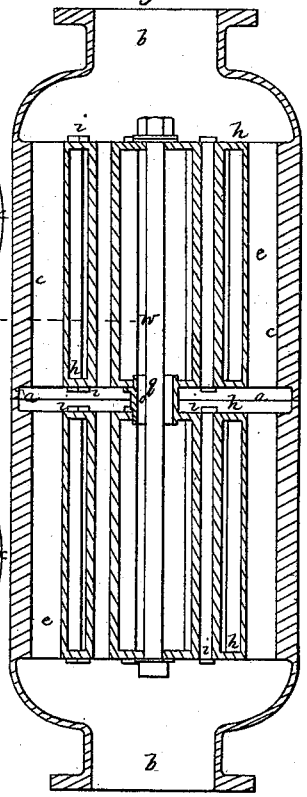
Figure 2:
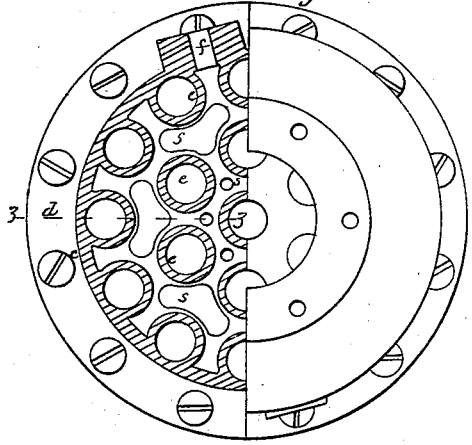
Figure 6:
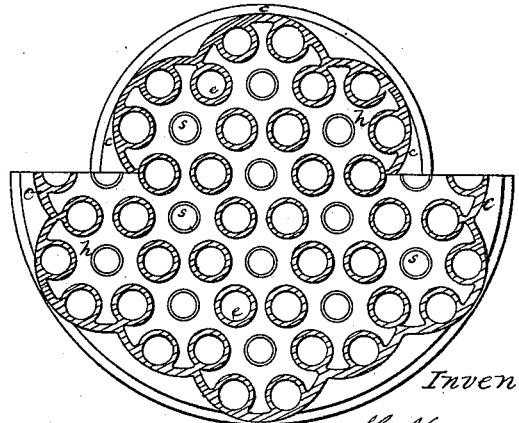

Figure 1 is a longitudinal view of my invention, one half seen in elevation, and one half in section on the line $(z, z)$ of Fig. 2, which is a half plan of Fig. 1, and a half cross section on the line $(y, y,)$ of the same figure. Fig. 3 is a section on the lines $(x\ x)$ $(x\ x)$, seen in Figs. 4 and 5, showing a modification in the construction of my invention. Fig. 4 is a half plan of Fig. 3, and a half cross section on the line $(w\ w)$ of the same figure. Fig. 5 is the reverse plan of either half of Fig. 3. Fig. 6 shows two half cross sections, each of which exhibits a modification of the case or external form of my invention, for the purpose of ornamentation. Fig. 7, Sheet 2, is a view of two of the sections of a condenser, seen as a whole in Fig. 9, it is one half in elevation, and one half in section on the line $v, v$ seen in Fig. 8. Fig. 8 shows one of the sections, seen in Fig. 9, half in cross section on the line $(u\ u)$ Fig. 7, and also on the line $(t\ t)$ of the same figure.

Similar letters refer to similar parts in all the figures of the drawings.

The nature of my invention consists in forming heaters or condensers, or sections thereof, by constructing an outside case with heads having tubes joining and connecting the heads within the space inclosed by them and the case, so that there shall be no joints between the case and heads, or between the tubes and heads.

By constructing heaters and condensers of homogeneous material, and without joints between the parts mentioned, I avoid unequal expansion and contraction, and galvanic action incident to the various constructions of such articles which are too well known to need enumeration here.

My invention enables me to give heaters and condensers an ornamental form, when desirable, at but a slight additional expense, and also to produce them of a plain form at a cost greatly below that of any other construction, of the same capacity, for similar purposes now in common use, and by it also liability to accident and cost of repairs are greatly reduced.

To enable those skilled in the art to make and use my invention I will describe its construction and operation, premising that the manipulations of casting and molding, at the foundry, are similar to those required for the casting of many other articles, are well known to the foundry-man, and need no description from me.

Figs. 1 and 2 represent a heater cast in two parts which are faced at the joint $(a, a)$, and are secured to each other by screws through the flanges $(d, d)$. Steam enters and is discharged through the pipes $(b, b)$, which in this case are cast one with the case $(c, c)$, and so as to form a chamber over the mouths of the tubes $(e, e)$. The steam in passing through the tubes $(e, e)$ parts with a portion of its heat to the water which enters and is discharged through the openings $(f, f)$, filling in its passage the space between the case and the tubes and heads, and passing from one section of the heater to the other through the apertures $(s\ s)$, which also serve in casting for vents for the cores.

In Figs. 3, 4 and 5 the manner of securing the sections together, by a bolt in the axis of the heater, is plainly shown; the steam and water pass in and out through similar openings to those described for Figs. 1 and 2, but the water passes from section to section through the space between the ferrule $(o)$ and bolt $(q)$. The tendency to separate the sections being equal to the area of said space multiplied by the pressure between the heads, and as that area never need exceed the area of the water pipe, it is evident that the size of the bolt can be easily determined. The case extends beyond the heads $(h, h)$ sufficiently to give space between them for the heads of the plugs $(i\ i)$ with which the core vent holes are stopped; this construction renders it unnecessary to face the heads as in Figs. 1 and 2, all that is required is to face the rings formed by the extension of the case.

To change the action of the heaters described to condensers it is only necessary to increase the supply of water, in proportion to the steam, to such an extent as to condense the steam, and to add the usual means for drawing off the water of condensation and uncondensed vapors.

Figs. 7, 8, and 9 illustrate a modification of my invention as applied to a surface condenser. The core vent holes are best stopped as before described, or they may have pipes inserted and secured as shown in Fig. 7 or in some other well known manner, but the surface thus gained does not in my opinion compensate for the risk incurred of leakage, &c.

The number of sections in my heater, their size and form, and the mode of securing them together, the size, number, and form of the tubes, and other details, may be much varied, as I have endeavored to show by the drawings, without departing from the principles of my invention.

The method which I have described of carrying out my invention or reducing it to practice, viz: by casting, is the best method or process known to me, but is not the invention itself, or its essence.

I do not claim, as of my invention, constructing heaters or condensers in such a manner that the case, tubes, and tube sheets (either of the entire article, or any division section or duplicate thereof) shall all or singly be connected, one with the other, by means of screws, bolts, solder or by any other analogous means.

Claim:

Constructing heaters or coolers by forming the tubes, tube sheets, and case thereof of homogeneous metal and without joints uniting said parts.

J. C. HOADLEY.

Witnesses:
J. B. Crosby,
A. M. Furbush.